United States Patent [15] 3,638,183

Prögler et al. [45] Jan. 25, 1972

[54] THRESHOLD VALUE CIRCUIT

[72] Inventors: Max Prögler; Klaus Wessenberg; Winfried Wagner, all of Ulm(Danube); Horst Ohnsorge, Erstetten, all of Germany

[73] Assignee: Licentia Patent-Verwaltungs-G.m.b.H., Frankfurt, Germany

[22] Filed: Mar. 9, 1970

[21] Appl. No.: 17,635

[30] Foreign Application Priority Data

Mar. 7, 1969 Germany ......................P 19 11 678.0
Sept. 26, 1969 Germany ......................P 19 48 738.8

[52] U.S. Cl. ............................340/146.1, 307/235, 325/41, 328/115, 340/169
[51] Int. Cl. ...........................................G08c 25/00
[58] Field of Search ...............340/146.1, 169, 172; 328/115, 328/132, 149; 325/41, 42; 307/235; 325/323

[56] References Cited

UNITED STATES PATENTS 3,214,700 10/1965 Hook ................................328/115 X
3,387,222 6/1968 Hellwarth et al...................307/235 X
3,479,599 11/1969 Molik ....................................325/323
3,502,993 3/1970 Schurzinger et al. ..............307/235 X

*Primary Examiner*—Charles E. Atkinson
*Attorney*—Spencer & Kaye

[57] ABSTRACT

A threshold value circuit for a data transmission system in which at the receiver site the transmitted demodulated binary signals are fed to the threshold value circuit to produce an indication regarding errors in the character bits of the received character. The threshold circuit includes a pair of parallelly connected circuit paths having one end thereof connected to the source of signals and the other ends thereof connected to a comparator. One circuit path has a transfer function whose value is less than 1 while the other circuit path contains circuitry for storing and delaying the peak value of the received signal to provide a threshold level signal for the comparator; the value of the threshold level changing in accordance with changes in the level of the received signal which persists for a given time period.

21 Claims, 11 Drawing Figures

INVENTORS.

Max Prögler
Klaus Wessenberg
Winfried Wagner
Horst Ohnsorge

BY Spencer & Kaye
ATTORNEYS.

INVENTORS.
Max Prögler
Klaus Wessenberg
Winfried Wagner
Horst Ohnsorge
BY Spencer & Kaye
ATTORNEYS.

INVENTORS.
Max Prögler
Klaus Wessenberg
Winfried Wagner
Horst Ohnsorge
BY Spencer & Kaye
ATTORNEYS.

THRESHOLD VALUE CIRCUIT

BACKGROUND OF THE INVENTION

The present invention relates to a data transmission system in which the signals are fed into threshold value circuits at the receiver site and actuation or nonactuation of these circuits is an error indication for the character bits of the received character. More particularly this invention relates to the threshold value circuits for such systems.

In data securing systems for data transmission over public telephone lines, error detectors are advantageously used. These error detectors monitor the signals arriving at the receiver through the transmission channel and indicate errors in the received signals, which might lead to errors in the demodulator, to the securing system. At the present time frequency modulators and demodulators (FM modems) are predominantly used for data transmission over the public telephone net. The modulation process is a binary frequency shift keying. In such a process, a positive input voltage at the modulator results in the emission of a sinusoidal voltage of high frequency, a negative voltage results in the emission of a lower frequency. Typical values for such systems are 2,100 and 1,300 Hz. for the data channel, 450 and 390 Hz. for the auxiliary channel (check channel). In the main channel this makes possible up to 1,200 frequency shifts per second.

A number of proposals have been made which indicate at which signal and in which manner the error recognition is to be accomplished. It has been shown that error recognition before demodulation does not furnish a sufficiently high correlation with the actually occurring errors. Either the recognition capability becomes too low or, when the detectors are set to be more sensitive, the redundancy (unnecessary error indication) becomes too high. Substantially better results are furnished by error recognition at the demodulated signal as it is disclosed, for example, in German published Pat. application Auslegeschrift No. 1,208,332.

In this known arrangement the demodulated signal appears in the form of two voltages $u_1$ and $u_2$ at the output of two rectifier arrangements which are connected to band-pass filters tuned to the high frequency $f_1$ and the low frequency $f_2$. In the ideal case, when $f_1$ is received, $u_1$ has the value $U_1$ and $u_2$ the value 0, and when $f_2$ is received $u_1=0$ and $u_2=U_2$. The difference $u_1-u_2$ is thus positive when $f_1$ is received and negative when $f_2$ is received. A threshold value circuit then derives therefrom, in a simple manner, the digital output signal. Errors or interference in the channel bring about the result that the two frequencies $f_1$ and $f_2$ are no longer received in a mutually exclusive manner. Different possibilities are conceivable:

1. The output voltage in a partial frequency band does not reach the value $U_1$ or $U_2$, respectively, whereas it remains in the other band;
2. The output voltage becomes 0 in both partial bands;
3. Energy appears in both bands, where $0<u_1\leq U_1$ and $0<u_2 \leq U_2$.

Possibilities 2 and 3 are critical. Possibility 1 does not lead to an error as long as it does not change to possibility 2. In possibility 2 the decision circuit cannot make an unequivocal decision; the probability for an erroneous decision becomes 0.5. Possibility 3 has the result of possibility 2 when $u_1=u_2$. If the receipt of $f_1$ or $f_2$ is interfered with to such an extent that $u_1<u_2$ or $u_2<u_1$ respectively, an error results. Error detectors always attempt to narrow the decision range of the actual decision circuit, i.e., to set closer tolerances for the signal at which the decision is made. This leads, with the frequency keying here of interest, to the known amplitude tolerance detectors after demodulation. If $u_1$ and $u_2$ are available, a signal is considered to be without interference only when either $u_1$ lies above a threshold $x_1$ and $u_2$ at the same time is below a threshold $y_2$ or when $u_1$ lies below a threshold $y_1$ and at the same time $u_2$ is below a threshold $x_2$. The sensitivity of the error detector depends on the spacing of the thresholds from the zero line. An entirely equivalent detector is obtained with only two thresholds $x$ and $y$ when the error detection is accomplished with the difference or sum of the output voltages of the rectifier arrangements $u_1-u_2$ or $u_1+u_2$, respectively.

The known devices for error recognition have the drawback that the thresholds, which serve to determine the quality of the signal, must be set manually. This setting must be adjusted, particularly when the speed of the data transmission is changed or when the channel employed for the data transmission is changed.

In addition the decision threshold values must be varied during fluctuations in the signal level which are not due to interference so that no error indication is given in such a case. An example for such a case would be when the receiving level continuously increases over a long period of time, for example due to improved receiving conditions in wireless data transmission. In such a case the exceeding of the signal level of the set decision threshold value must not lead to an error indication.

With the presently known systems, if manual setting is to be eliminated, a complicated and expensive control amplifier is required.

SUMMARY OF THE INVENTION

It is accordingly the object of the present invention to eliminate the above-mentioned drawbacks. In particular, temporarily occurring fluctuations in the demodulated signal level are to be kept from exerting any further influence, except for a possibly desired indication, on the threshold level value whereas slow or long-lasting changes in the demodulated signal level are intended to influence the decision threshold values in the sense of a followup.

The above object is attained according to the present invention by providing a threshold circuit having a network whose transfer function has a value less than 1 connected in parallel with a series connection of a peak value rectifier (half-wave rectifier) and a memory-delay means, the latter transmitting only such level fluctuations which are present at the memory-delay means over a period longer than a given time period, and that the outputs of the memory-delay means and of the network are connected to the inputs of a comparator which emits a characteristic output signal when the output values of the memory-delay means and those of the network differ by more than a given value.

DESCRIPTION OF THE PREFERRED EMBODIMENTS

Figure 1:
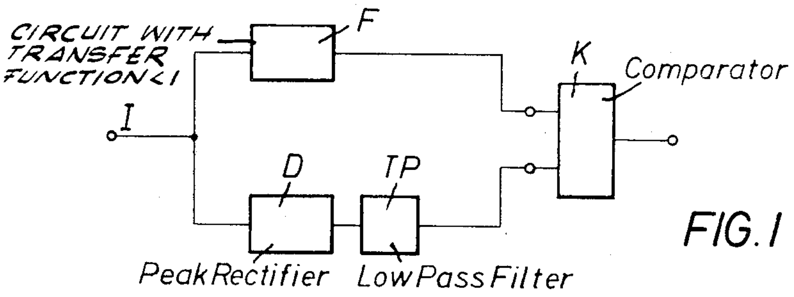
FIG. 1 is a block diagram of the basic threshold circuit according to the invention.

Referring now to FIG. 1, the signals to be evaluated are fed via input terminal I to a memory-delay means TP via a peak or half-wave rectifier circuit D. The transmission or memory-delay network TP has the characteristic feature that its output value adapts itself, after a given delay, to the input value, but that this occurs only when the input value is present at the input thereof for a certain predetermined time period. Such a network may be realized, for example, in the form of a low-pass filter. Connected in parallel with the series connection of the peak rectifier D and the memory-delay means is a network F whose transfer function has a value less than 1. The output values of networks TP and F are fed to a comparator K, which compares these output values and emits characteristic output signals when a given ratio of these values has been exceeded.

If the signal level at the input I of the circuit according to FIG. 1 exhibits temporary fluctuations, such fluctuations will be reduced corresponding to the transfer function of network F and fed directly to the comparator K. However, the temporary fluctuations are not transmitted by the network TP, i.e., the low-pass filter, over the other branch of the circuit so that a constant value is presented at the second input of the comparator K. When the level fluctuations exceed a given value, the comparator K so indicates.

Temporary level fluctuations in the above sense are also constituted by the signals to be evaluated. In this case the comparator operates as a threshold value circuit as described in the introductory paragraphs. It is also possible, however, when other requirements are placed on the data transmission system, to utilize the output signal of comparator K as the error indication.

If the level fluctuations of the signal applied at I are slow, however, or if one change in the level lasts for a relatively long period of time, the output value of memory-delay means TP gradually assumes a new value so that the comparator K either emits no output signal or no longer emits a characteristic output signal which serves as an indication.

Figure 2:
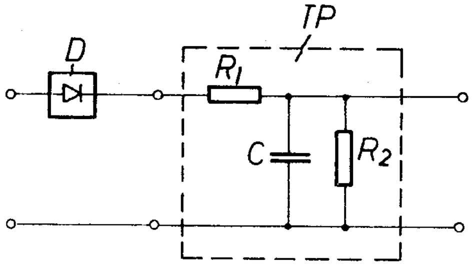
FIG. 2 is a schematic diagram illustrating the circuit contents of the memory-delay means TP of FIG. 1 according to one embodiment of the invention.
Figure 3A:
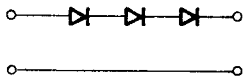
FIGS. 3*a*–3*c* illustrate a number of different ways of forming the network F of FIG. 1 whose transfer function has a value less than 1.
Figure 3B:
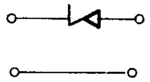
Figure 3C:
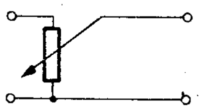

FIG. 2 shows a simple realization for the series connection for components D and TP. The peak rectifier is a simple diode, while the memory-delay means TP is a low-pass RC filter. In this filter the capacitor C is charged through a first resistor $R_1$ and discharged through a second resistor $R_2$. The network F can be realized in a number of very simple configurations, e.g., a plurality of diodes connected in series in the forward direction (whose number depends on the system parameters) as shown in FIG. 3*a*, a zener diode operated in the blocking direction as shown in FIG. 3*b*, or an ohmic voltage divider as shown in FIG. 3*c*.

Figure 4:
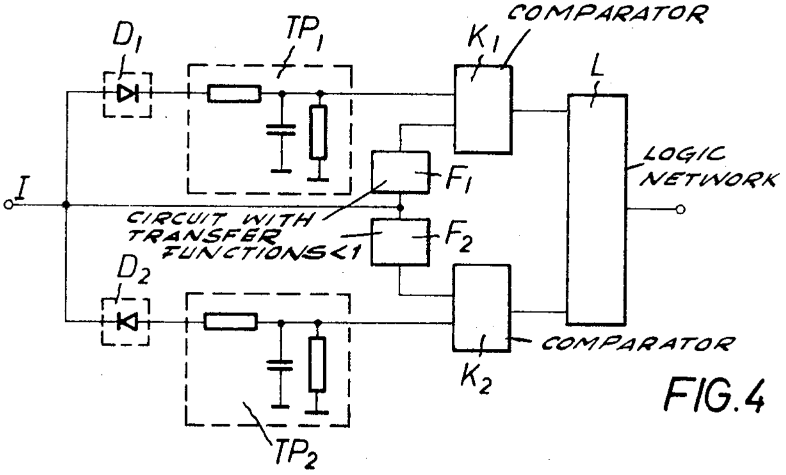
FIG. 4 is a partially schematic, partial block diagram illustrating a complete threshold circuit for evaluating signals of both polarities according to one embodiment of the invention.

According to a further development of the invention, a circuit having an upper and a lower threshold value may be realized by providing a pair of threshold circuits as shown in FIG. 1, with only the polarity of the diode of the peak rectifier circuits D being oppositely poled. Such a circuit is shown in FIG. 4 wherein the reference designations of the various elements and networks correspond to that of FIG. 1, the indicia 1 and 2 indicating the association with the upper or lower threshold value, respectively. As further indicated in FIG. 4 according to a further embodiment of the present invention, the outputs of the comparators $K_1$ and $K_2$ are fed to a logic network L which performs the further signal evaluation.

The requirements for the emission of an output signal for the comparators can be formulated as follows. When the voltages at the inputs of comparator $K_1$ are marked $U_{11}$ and $U_{12}$, the output signal $K_1$ will appear when $$(U_{11}/U_{12})>1+\epsilon_1$$

Correspondingly, comparator $K_2$ emits an output signal when the following applies for its input values $U_{21}$ and $U_{22}$:

$$(U_{21}/U_{22})>1+\epsilon_2$$

Values $\epsilon_1$ and $\epsilon_2$ are greater than 0 and are determined by networks $F_1$ or $F_2$, respectively.

Figure 5:
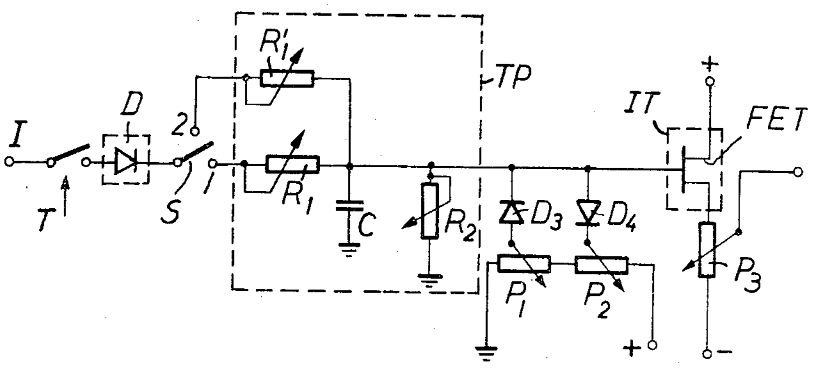
FIG. 5 is an electrical schematic diagram of a preferred configuration of a portion of threshold circuit according to one embodiment of the invention.

FIG. 5 shows an embodiment for the series connection of peak rectifiers and memory-delay means (low-pass filter) which differs from the previously described circuits. Resistors $R_1$ and $R_2$ of FIG. 2 are here designed as potentiometers in order to be able to vary the "followup" of the threshold values by varying the low-pass parameters.

Preferably, as indicated a switch T is provided in series with the input I which switches the circuit only at such times when the center of the transmitted data characters is present (clocked operation). This switch T may be externally controlled in a manner well known in the art to provide this function. To control the switch T we need the clock of the data transmission system. According to CCITT Recommendation V24 (Blue Book, Geneva 1964) the center of the data character is defined by the negative slope of the clock. This slope may trigger a one shot which controls switch T.

Additionally, in order to maintain the delay period of the memory-delay means TP (in this case the low-pass filter) constant during clocked and nonclocked operation, a pair of load resistances $R_1$ and $R_1'$ respectively are provided for the capacitor C. These resistances are switched into the circuit in accordance with the keying ratio of the pulses actuating switch T.

During normal operation, i.e. switch T is always closed, resistor $R_1$ is connected to the rectifier D. When clocked operation is done, resistor $R_1'$ will be connected to rectifier D (instead of $R_1$). That means that switch S is switched from position 1 to position 2 (see FIG. 5). If $r_k$ denotes the keying ratio of switch T, the condition for resistor $R_1'$ is.

$$R_1'=r_k\cdot R_1$$

$$\left(r_k=\frac{\text{time switch T closed}}{\text{time switch T open}}\right)$$

This makes the "followup" of the threshold values independent of the mode of operation (clocked or not).

The circuit of FIG. 5 also shows a simple and advantageous possibility to limit the variation range of the threshold values. This is accomplished by a limiter circuit including a pair of antiparallel connected diodes $D_3$ and $D_4$ which are biased by voltage dividers $P_1$ and $P_2$, respectively and which are connected to the output of the memory-delay means TP to determine a lower and an upper limit for the control range. This limiter circuit gives the circuit protection against overcontrolling.

Finally, the circuit according to FIG. 5 also shows an advantageous design for the output in that the network TP is connected to the comparator K via an impedance transformer IT which makes the network TP independent of the loads. The impedance transformer IT may, for example, be a field effect transistor (FET) connected to act as a voltage follower as illustrated. This field effect transistor has a drain resistance $P_3$ with potentiometer pickup to compensate for the negative bias of the control electrode with respect to the drain. Instead of the FET it is also possible to use a transistor connected as an emitter follower.

FIG. 5 shows only one circuit which operates in the manner of FIG. 2. Accordingly, for the total circuit according to FIG. 4, two circuits according to FIG. 5 would again have to be provided.

Figure 6A:
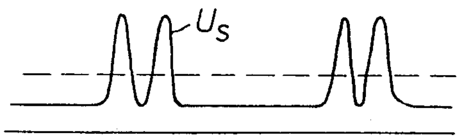
FIG. 6*a* and 6*b* show unfavorable and favorable waveforms respectively for permitting the automatic variation of the threshold value according to the embodiment of the invention of FIG. 2.
Figure 6B:
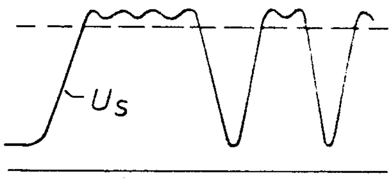

According to the above-described invention, the decision thresholds, i.e., the outputs of network TP, occur delayed in time when the signal level of the input signal of input I changes. With the embodiments of the invention shown in FIGS. 2, 4, and 5, the waveform to be evaluated is very important for the value at which the decision thresholds are set and for the delay time with which the followup is performed. FIG. 6*a* shows a particularly unfavorable waveform where a relatively low level is present for long periods of time so that the decision thresholds have also adapted themselves to relatively low value; if then peak signals suddenly appear, these are erroneously interpreted as errors. FIG. 6*b* shows a more favorable waveform with which it is possible to adapt the thresholds. Such waveforms may appear, for example, when in a known method with monitoring of a sum voltage (e.g., according to German published Pat. application (Auslegeschrift) No. 1,294,435) there occurs a sequence of 0–1 changes.

In order to avoid the dependence of the threshold values on the waveform, according to a somewhat different technical solution which is based, however, on the same considerations as the solutions described above, it is proposed to construct the threshold value circuits as memory arrangements in such a manner that amplitude values of the signals scanned at given moments are applied thereto and that these amplitude values are stored at least to the next given moment.

As with the embodiments of the invention already described, the considerations for this additional embodiment are based, on the one hand, on the problem of preventing followup of the decision threshold values when temporary interferences occur and, on the other hand, to provide for followup of the decision threshold values when the decision threshold values have been exceeded by the input signal to be tested for a given time period.

Figure 7:
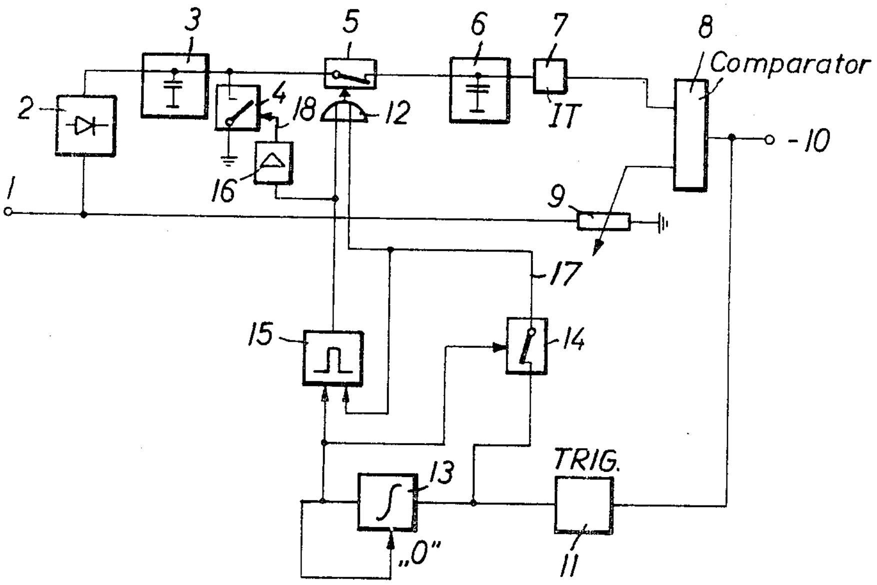
FIG. 7 is a block diagram of another embodiment of a threshold circuit according to the invention.

Referring now to FIG. 7, there is shown a block circuit diagram for a single decision threshold circuit. Applied to the input 1 is the signal voltage $U_S$ to be tested. Connected to input 1 is a peak rectifier 2, e.g., a half-wave rectifier, whose output is connected with the input of a maximum value memory 3 containing a memory capacitor which is charged to the voltage applied to the peak rectifier 2. The output of the maximum value memory 3 is connected to a first switch 4 which is normally open and which in its closed state discharges the maximum value memory 3 to ground. In addition to the first switch 4, a second, normally open, switch 5 is connected to the maximum value memory 3 which connects the output of the maximum value memory 3 in series with the input of a threshold value memory 6. The threshold value memory 6 is again provided with a storage capacitor. Advisably an impedance transformer 7, such as indicated by IT in FIG. 5, is connected to the threshold value memory 6. The output of the impedance transformer 7 is connected with one of the inputs of a comparator 8 whose other input is connected with input 1 via a setting member 9 which in the simplest case is designed as a potentiometer, and hence has a transfer function whose value is less than 1.

The comparator 8 now compares the voltages at its two inputs and then emits a signal when the voltage furnished at the output of setting member 9 exceeds the voltage furnished by the impedance transformer 7, which signal serves as an error indication and can be taken off at output 10.

The control of switch 5 determines the transfer of the contents from maximum value memory 3 into threshold value memory 6. This control is arbitrary and can be accomplished, for example, in the manner that switch 5 is periodically closed, i.e., temporarily closed at constant intervals, to assure transfer and is open all other times. Such a control is basically provided by the output pulses from the clock pulse generator 15, via an OR-gate 12.

According to the present invention, however, switch 5 is further controlled in dependence on the output value of comparator 8, i.e., in dependence on the presence of an error. The type of control according to this advantageous further development will be explained in detail below.

Connected with its input to the output of comparator 8 is an error detector circuit 11. The error detector 11 is designed, for example, as a trigger circuit and is responsive to the output signals from comparator 8 so that it emits an output pulse whenever the characteristic output value is present at the output of comparator 8, i.e., when there is an error. The output pulse from error detector circuit 11 is transmitted via a normally closed switch 14 and lead 17 to one input of OR-gate 12 whose output controls the opening and closing of the switch 5. Simultaneously the output pulse on lead 17 is fed to the clock pulse generator 15 causing it to emit an output pulse which is also fed to the OR-gate 12. Since input signals are thus provided to both inputs of the OR-gate 12, the switch 5 is maintained in its open position. The output pulse from error detector circuit 11 must be sufficiently long to prevent switch 5 from closing and thus causing a change in the contents of threshold value memory 6. In other words, when an error indication occurs at the output of comparator 8, error detector 11, OR-gate 12 and switch 5 prevent the threshold value memory 6 from assuming a new threshold value, and thus the decision threshold value is held at its present value. The output pulse from clock pulse generator 15 is also fed via a differentiating network 16 to the switch 4 causing it to momentarily close and discharge memory 3, whereby it can then assume a new value.

According to a further feature of the present invention, the decision threshold value is changed to a new value when a longer-lasting deviation is present, i.e., when a continuous error indication appears at the output of comparator 8.

To accomplish this, an integrator 13 is provided whose input is connected with the output of the error detector circuit 11. When the error detector 11 emits a pulse due to the presence of an error indication, the integrator 13 begins to integrate the input pulses thereto over a fixed period of time. If further pulses now follow at the output of error detector 11, i.e., if the interference has a longer duration, and the integrated value exceeds a given value, the integrator 13 produces an output signal which is utilized to terminate holding the decision threshold value at the previous value and to initiate a followup to a new value. The integrator 13 determines the pulse density, i.e., the frequency of the occurrence of the error indication over time. If the error indication is too short, the integrator 13 will set itself to 0 within one time constant.

When the given value for the integrator is exceeded, the output signal from the integrator 13 first causes switch 14 to open, so that direct control of switch 5 by the output pulses from error detector 11 is interrupted. Furthermore, the output pulse from integrator 13 immediately sets the integrator to 0.

In order to eliminate dead times which occur when the given value of the integrator 13 is exceeded between two closing pulses for the switch 5 from clock pulse generator 15, clock pulse generator 15 is caused by the output of integrator 13, to immediately emit a closing pulse. Thus the value of the maximum value memory 3 is transferred to the threshold value memory 6 without any delay.

In order to then prepare the maximum value memory 3 to accept a new voltage value, switch 4 is subsequently closed. This can be accomplished in a simple manner by differentiating the closing pulse for switch 5 emitted by generator 15 so that the trailing edge of this closing pulse closes switch 4. For this purpose a differentiating member 16 is connected between the output of the clock pulse generator 15 and the control input 18 of switch 4.

Figure 8:
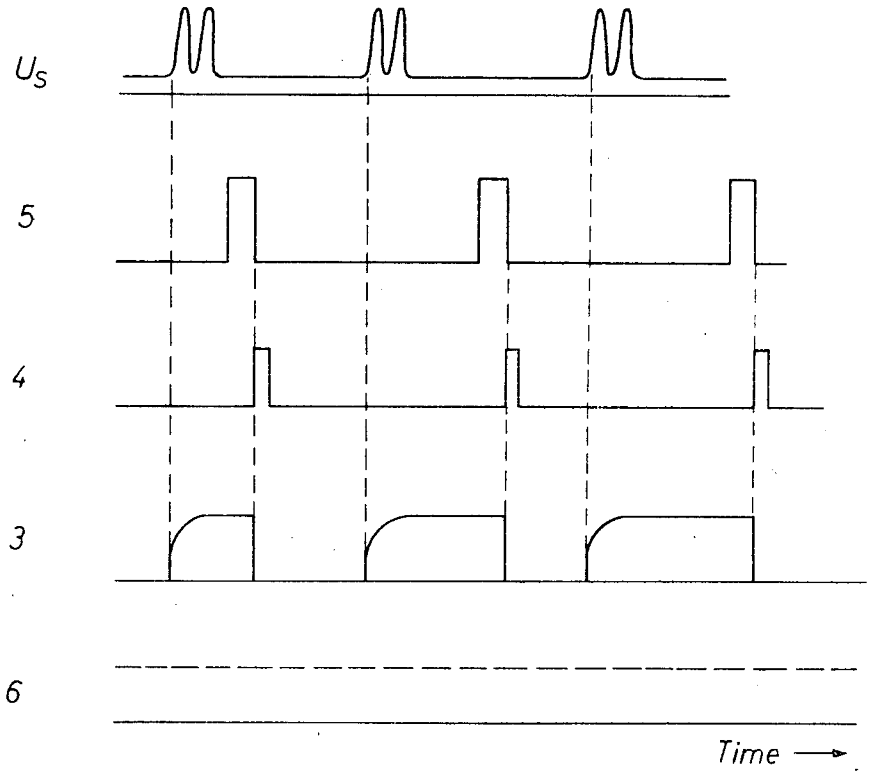
FIG. 8 is a series of waveforms illustrating the operation of the embodiment of the invention shown in FIG. 7.

FIG. 8 finally shows a pulse diagram which shows the conditions when the waveform according to FIG. 6*a* is present. The positive pulses at switches 4 and 5 here indicate closing of the respective switch. The pulse sequence of the switches is, of course, independent of the signal sequence. The maximum value memory 3 assumes a voltage value when the signal peaks occur and holds this value until the end of the memory period, while the threshold value memory 6 does not change its value in direct dependence on the signal peaks but rather only when the switch 5 is closed.

It is to be understood that in many applications it will be necessary to provide a plurality of thresholds which can each be exceeded in their respective directions or polarities. In such cases the illustrated circuit of FIG. 7 must be provided in the appropriate multiplicity.

It will be understood that the above description of the present invention is susceptible to various modifications, changes and adaptations and the same are intended to be comprehended within the meaning and range of equivalence of the appended claims.

We claim:

1. In a data transmission system in which the signals are fed at the receiver site to threshold value circuits whose actuation or nonactuation represents the error decision for the character bits of the received character; said threshold value circuit comprising:

first and second circuit paths connected between the input to said threshold circuit and the inputs of a comparator means, said comparator means emitting a characteristic output signal when the amplitudes of the input signals thereto deviate from one another by a given value;

said first circuit path consisting of a network whose transfer function has a value less than 1; and said second circuit path including a half-wave rectifier connected in series with a circuit means having its output connected to one of the inputs of said comparator means for storing and delaying the peak value of the rectified signal, said circuit means changing the level of its output signal when a change in the level of the rectified signal has persisted for a given time period.

2. The apparatus as defined in claim 1 wherein said circuit means only changes its output signal when the change in the level of the rectified signal has persisted for said given time period.

3. The apparatus defined in claim 2 wherein said circuit means is a low-pass filter.

4. The apparatus as defined in claim 1 wherein said network is an ohmic voltage divider.

5. The apparatus as defined in claim 1 wherein said network is a plurality of diodes connected in series in the forward direction.

6. The apparatus as defined in claim 1 wherein said network is a zener diode connected in the blocking direction.

7. The apparatus as defined in claim 1 wherein the half-wave rectifier comprises a diode.

8. The apparatus as defined in claim 3 wherein said threshold circuit includes third and fourth circuit paths having their outputs connected to the inputs of a second comparator means, said third and fourth circuit paths corresponding structurally to said first and second circuit paths respectively, the half-wave rectifier of said fourth circuit path being oppositely poled from that of said second circuit path.

9. The apparatus as defined in claim 3 including switch means for feeding the transmitted signals to said threshold circuit only at the moment of the center of the transmitted signal.

10. The apparatus as defined in claim 3 including impedance transformer means connected between the output of said low-pass filter and the respective input of said comparator means.

11. The apparatus as defined in claim 10 wherein said impedance transformer comprises a field effect transistor.

12. The apparatus as defined in claim 11 wherein the drain resistor of the field effect transistor is a potentiometer.

13. The apparatus as defined in claim 10 wherein said impedance transformer is a transistor connected as an emitter follower.

14. The apparatus as defined in claim 13 wherein the emitter resistance of said transistor is a potentiometer.

15. The apparatus as defined in claim 3 wherein the low-pass filter is an RC network having adjustable ohmic resistors.

16. The apparatus as defined in claim 10 further comprising a limiter circuit including two antiparallel connected biased diodes connected to the output of said low-pass filter.

17. The apparatus as defined in claim 1 wherein said circuit means comprises first and second memory means, said first memory means being connected to the output of said half-wave rectifier for storing the peak value of said transmitted signal and said second memory means being connected to the input of said comparator means for storing the threshold value; and means for periodically connecting said first and second memory means to change the value stored in said second memory means to that instantaneously stored in said first memory means.

18. The apparatus as defined in claim 17 wherein each of said first and second memory means includes a memory capacitor and wherein said means for periodically connecting said first and second memory means includes a switch.

19. The apparatus as defined in claim 18 wherein said circuit means further includes an error detecting means responsive to said characteristic output signal from said comparator means for emitting an output pulse each time said characteristic output signal appears, and means responsive to said output pulses for maintaining said switch in an open position so that a shift of the erroneous value stored in said first memory to said second memory is prevented.

20. The apparatus as defined in claim 19 wherein said circuit means further includes an integrating means for emitting an output pulse whenever the integrated value of the output pulses from said error detecting means for a said given time period exceeds a given value, and means responsive to the output pulse from said integrating means for immediately closing said switch to transfer the contents of said first memory to said second memory and for subsequently causing said first memory to be reset for a short period of time.

21. The apparatus as defined in claim 18 wherein said circuit means includes:

trigger circuit for producing an output pulse whenever said comparator means produces said characteristic output signal;

an OR gate, the output signal of which controls the opening and closing of said switch, one input of said OR gate being connected to the output of a clock pulse generator, and the other input thereof being connected to the output of said trigger circuit via a normally closed switch;

a normally open switch connected between the output of said first memory means and ground, and means, including a differentiator, responsive to the output signals from said clock pulse generator for momentarily closing said normally open switch at the end of each clock pulse to discharge the capacitor of said first memory;

an integrating means for integrating the output pulses from said trigger circuit and producing an output signal whenever the value of the integral for a given period of time exceeds a given value; and means responsive to the output signals from said integrating means for opening said normally closed switch and for immediately causing said clock pulse generator to emit a clock pulse.

* * * * *